United States Patent [19]

Severson

[11] 4,149,524
[45] Apr. 17, 1979

[54] CORROSION RESISTANT SOLAR ABSORBER PANEL

[75] Inventor: Asbjorn M. Severson, Minneapolis, Minn.

[73] Assignee: Honeywell Inc., Minneapolis, Minn.

[21] Appl. No.: 836,806

[22] Filed: Sep. 26, 1977

[51] Int. Cl.$^2$ ............................................. F24J 3/02
[52] U.S. Cl. ................................. 126/271; 165/171; 29/157.3 D
[58] Field of Search ............... 126/270, 271; 165/171; 29/157.3 D

[56] References Cited

U.S. PATENT DOCUMENTS

| | | | |
|---|---|---|---|
| 2,690,002 | 9/1954 | Grenell | 29/157.3 |
| 3,120,869 | 2/1964 | Carpenter | 165/171 |
| 3,172,194 | 3/1965 | Pauls | 29/157.3 |
| 3,346,220 | 10/1967 | Lemelson | 244/117 |
| 3,831,246 | 8/1974 | Morris | 29/157.3 |
| 4,081,026 | 3/1978 | Kleine et al. | 165/170 |

Primary Examiner—Carroll B. Dority, Jr.
Attorney, Agent, or Firm—Charles G. Mersereau

[57] ABSTRACT

A solar absorber panel and method of making is disclosed in which a fluid heat transfer system of elongated hollow passages connecting inlet and outlet headers is fabricated of an array of two layers of strips of thin gauge stainless steel superimposed upon the reverse side of a mild steel absorber plate. The array of strips of thin gauge stainless steel is seam welded about the periphery of the strips and inflated to produce the hollow fluid passage system. The peripheral seam welding fixes the edges of the superimposed strips both to each other to seal the lattice fluid passage system and to the mild steel absorber plate. Inlet and outlet connectors fixed to the appropriate openings in the upper stainless steel lattice layer are also used for the inflation of the passage system. The construction of the solar absorber presents a corrosion resistant system which minimizes 5 Claims, 4 Drawing Figures U.S. Patent        Apr. 17, 1979        4,149,524
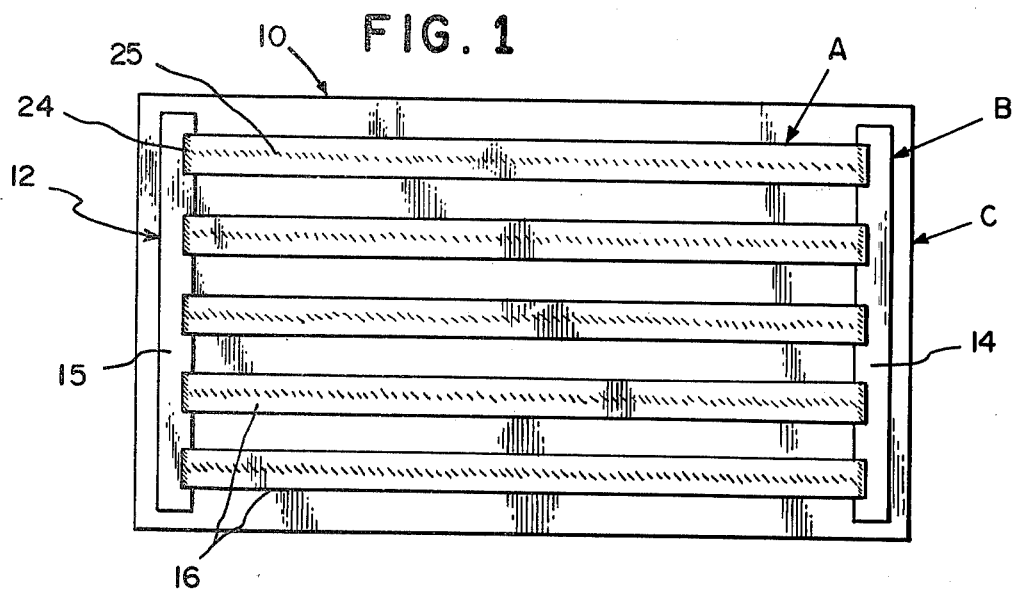
FIG. 1
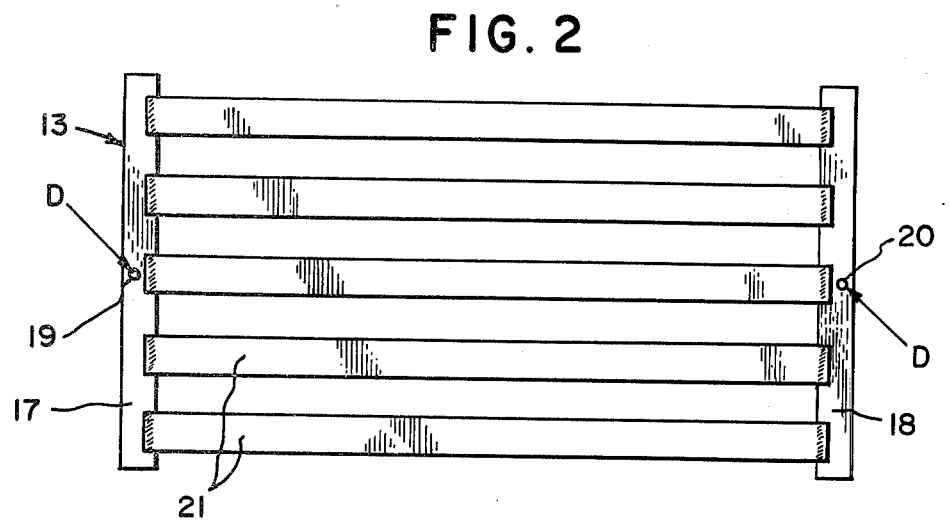
FIG. 2
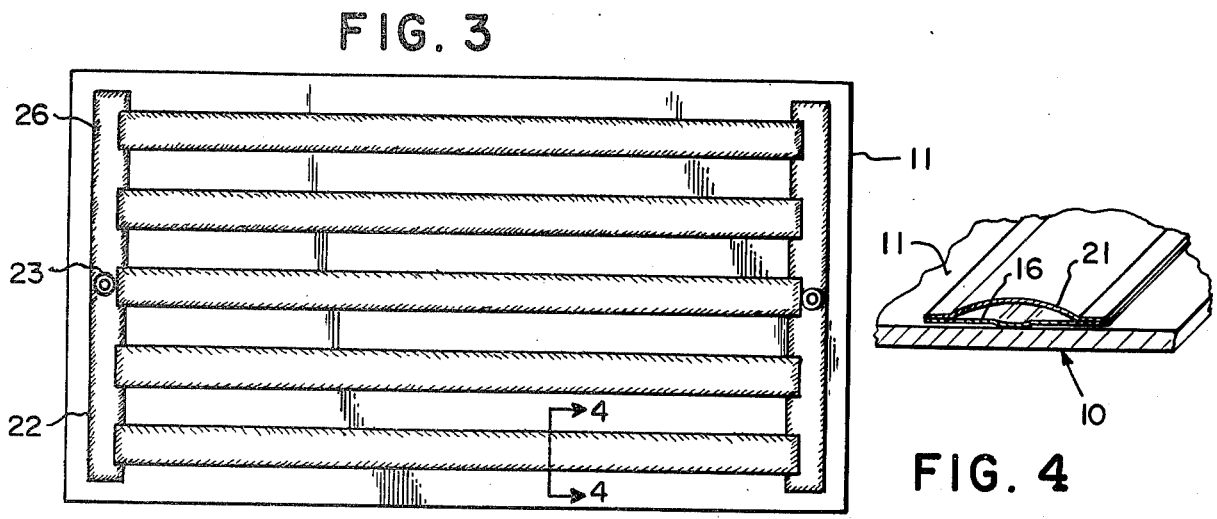
FIG. 3
FIG. 4

CORROSION RESISTANT SOLAR ABSORBER PANEL

BACKGROUND OF THE INVENTION

1. Field of the Invention

The present invention relates broadly to the field of solar energy utilization and, more particularly, to a mild steel-stainless steel solar absorber panel and method of fabicating which minimizes the amount of stainless steel required yet accomplishes all the advantages of corrosion resistance in the fluid flow heat transfer system.

2. Description of the Prior Art

The rapid depletion of conventional sources of energy has resulted in an ever widening research for alternatives to such conventional sources as petroleum and natural gas to meet the increasing demand for energy by our society today. One such viable source which is presently commanding a great deal of attention in research and development and in the deployment of experimental units is that of solar energy. Solar flat plate collectors may be employed, inter alia, as sources of heat for homes and buildings and for maintaining an adequate supply of hot water in such installations. Generally, the prior art contains many examples of different ways to utilize solar energy absorbed by solar flat plate collectors of various types. Normally a solar absorber plate having a black body surface is utilized to absorb heat from solar radiation and a heat transfer system is operated in conjunction with the absorber plate to remove useful heat from the absorber and conduct it to a place where it is utilized or stored. Solar collector panels have been utilized to heat a variety of fluid media through heat transfer systems utilizing the solar absorber plate. The higher heat transfer coefficient of liquid media together with the higher heat capacity per unit mass exhibited by such materials as opposed to gaseous fluids results in an ability to obtain an efficient use of the solar energy absorbed.

While research in materials of construction and the use of different configurations to achieve more efficient systems is on-going, one of the greatest drawbacks of present-day solar energy systems is the cost. Reduction in the cost of materials and labor in assembling the solar absorber panels including heat transfer media passage systems along with any increase in efficiency is a desired goal.

One of the primary considerations in the construction of solar energy absorber panels is found in the requirement for long life and durability of the panel itself. An important concern in the design of any liquid media heat transfer system, of course, is overcoming the ever-present danger of corrosion in the system. The solar absorber panels must be sufficiently strong and long-lived in the environment of the solar collector which includes long-term exposure to solar radiation, wide variances in ambient temperature and constant exposure to possibly corrosive media. Mild steel is an abundant, relatively inexpensive commodity which is not appreciably affected either by wide swings in ambient temperature or long-term exposure to solar radiation. However, the relatively high rate of oxidation coupled with the permeability of the oxide layer formed makes mild steel extremely susceptible to liquid-induced corrosion. Thus, while in other respects mild steel is a desirable material for the fabrication of solar absorbers, the problem of corrosion of the fluid-heat transfer passages is very great and must be overcome to produce a solar collector having a long, useful life. This must be done without substantially increasing the risk of galvanic corrosion induced by utilizing dissimilar metal materials such as copper cladding or the like.

SUMMARY OF THE INVENTION

According to the present invention, the relatively low cost of utilizing a mild steel solar absorber plate is retained while providing a practical means for overcoming corrosion problems associated with the use of mild steel and the use of dissimilar metals and electrical contact. This is done by the provision of a mild steel solar absorber panel which has an integral fluid heat transfer passage system fabricated of a lattice work of stainless steel. The fluid heat transfer passage system is fabricated of an array of strips of very thin gauge stainless steel sheet superimposed upon the mild steel absorber plate, peripherally seam welded and inflated to produce the desired hollow fluid passage system including spaced passages connecting inlet and outlet headers. The peripheral seam welding fixes the edges of the superimposed strips both to each other to seal the fluid passage system and to the mild steel absorber plate. Inlet and outlet connectors fixed to openings in the appropriate upper stainless steel header strips are used both in the fluid flow connection and for inflation of the passage system which may be done either hydraulically or pneumatically.

The construction of the solar absorber panel of the present invention presents a relatively corrosion free heat transfer passage system, on the one hand, and on the other hand, minimizes the amount of stainless steel required to accomplish this end. The construction also readily lends itself to high-speed, automated fabrication.

BRIEF DESCRIPTION OF THE DRAWINGS

In the drawings wherein like numerals are utilized to designate like parts throughout the same:

FIG. 1 depicts a solar collector plate the first layer of stainless steel strips attached thereto;

FIG. 2 depicts the preassembled lattice work of the top layer of stainless steel strips of the invention;

FIG. 3 illustrates the top view of an assembled solar collector panel; and

FIG. 4 shows a fragmentary sectional view taken along lines 4—4 of FIG. 3.

DESCRIPTION OF THE PREFERRED EMBODIMENT

As shown in FIGS. 1-3, the solar absorber panel of the present invention embodies a solar absorber plate 10 having a first surface (not shown) for the absorption of solar energy and a reverse surface 11 which supports the lattice-type fluid heat transfer passage system of the invention. The heat transfer passage system of the invention includes two substantially identical, superimposed lattice works of stainless steel strips including a first or lower lattice work 12 and a second or upper lattice work 13 (FIG. 2). The lower lattice work 12 includes bottom manifold or collector strips 14 and 15 which are connected by a plurality of substantially parallel strips as at 16. The upper lattice work 13 includes upper header or manifold strips 17 and 18 provided by openings therein as at 19 and 20. The manifold strips 17 and 18 are connected by substantially parallel connector strips as at 21.

FIG. 3 depicts the basic assembled panel in which the lattice work 13 is superimposed on the lattice work 12 and peripherally sealed as by welding at 22. Couplings as at 23 are provided for connecting the system to the appropriate source of heat transfer medium (after inflation as discussed below).

The steps involved in fabricating the solar absorber panel of the present invention are also illustrated in FIGS. 1–3. Cut or slit strips of very thin gauge stainless steel are arranged in a lattice pattern as at 12 or 13. The ends of connector strips, as at 16 or 21, are secured to the header strips as at 13 and 14 in a manner in which provides a continuous fluid-tight seal. This may be accomplished by seam welding as at 24 to form a thin gauge lattice work as at 12. The lower lattice work 12 is then secured in the desired deposition on the reverse side of the 11 of the solar absorber plate 10 as by seam welding illustrated at 25. The prefabricated lattice work 13 is then superimposed upon the lattice work 12 and the entire periphery seam welded as at 26 (FIG. 3).

Nipples, couplings, or the like such as illustrated at 23 are fixed in fluid-tight fashion to the openings 18 and 19 of the lattice work 13. One of the connectors is then closed as by capping and the other attached to a source of high pressure pneumatic or hydraulic fluid. As illustrated in the fragmentary cross-sectional view of FIG. 4, when subjected to such pneumatic or hydraulic pressure the upper layer of stainless steel strips is caused to expand and bow out whereas the bottom layer remains rigidly flat against the absorber plate member 10 to which it has been fixed. This method produces a lattice work of elongated hollow passages to which the fluid heat transfer medium can be conducted to remove heat from the absorber panel.

It can readily be seen then that the construction of the solar absorber panel of the present invention readily lends itself to simple, automated techniques. The extremely thin gauge stainless steel lends itself readily to extremely rapid seam welding techniques such as those used in the fabrication of the familiar seam-welded steel food and beverage containers. The welding of such thin gauge material is, of course, far more rapid and less expensive than welding heavier gauge metals.

The seam welding as at 26, not only effectively seals the edges of the fluid flow passage lattice work, but also effectively seals the edges of the entire lattice work to the absorber member 10. This, along with the seam welding is shown at 25 (FIG. 1) secures the lattice passage system in the desired disposition and also increases the heat transfer to the lattice work from the surface 11 of the absorber plate 10.

The absorber plate 10 is normally made of a mild carbon steel sheet of a thickness sufficient to provide a self-sustaining member yet thin enough to provide good heat conductance from the absorbing surface to the reverse surface 11 of the plate. It is desirable that the stainless steel strips be extremely thin, i.e. from about 0.002 to about 0.010 inches in thickness. This reduces the cost of the assembled panel by reducing the amount of stainless steel required to accomplish the goals of construction of the panel and also increases the rate of heat transfer from the surface 11 to the fluid medium within the stainless steel passage. Strength is required only to prevent loss of the fluid heat transfer medium as the structural strength of the assembly is carried by the absorber plate 10.

No particular type of stainless steel is required in the fabrication of the present invention. The only requirement is that the particular composition involved be compatible with the fluid heat transfer medium used, be capable of the seam welding required in the fabrication of the lattice passage work of the invention and the available and extremely thin gauge sheets. A basic chrome stainless steel such as type 430 stainless which has typically good corrosion resistance and meets the other criteria is an example of a low cost stainless steel which can be utilized.

Because of the fabrication of the solar absorber of the present invention readily lends itself to automated fabrication techniques including high speed seam welding, this helps offset the slightly higher stainless steel material cost. It is believed that the cost is also offset by the corrosion resistance of the stainless and the excellent heat transfer through the thin gauge material.

The embodiments of the invention in which an exclusive property or right is claimed are defined as follows:

1. A solar flat plate absorber panel, comprising:
   a mild steel solar energy absorbing member having a front surface adapted to absorb solar radiation energy in the reverse surface for transferring said absorbed solar energy away from said absorbing members;
   a fluid heat transfer system having a plurality of elongated, laterally spaced, hollow, stainless steel fluid passages connected to common headers at each end and fixed to the reverse side of said mild steel absorber member to remove heat therefrom, each passage and headers of said passage system comprising two distinct superimposed layers of light gauge stainless steel strips fixed to the reverse side of said absorber member and sealed to each other about the periphery of the strips;
   means for connecting said fluid passage system to a source of fluid heat transfer medium.

2. The solar absorber panel of claim 1 wherein said strips of stainless steel are from about 0.002 inches to about 0.010 inches thick.

3. The solar absorber panel of claim 1 wherein said layer of stainless steel strips adjacent said absorber member are centrally welded to said absorber plate to increase conductive heat transfer.

4. The solar absorber of claim 1 wherein said hollow passages are formed by inflating said fixed double layer of strips through said connection means.

5. A method of fabricating a solar absorber panel comprising the steps of:
   fixing a configuration comprising a plurality of laterally spaced elongated strips of light gauge stainless steel and a common strip across each of the ends of said laterally spaced strips to the reverse side of a mild steel solar absorber member;
   superimposing a second substantially identically configuration of light gauge stainless steel strips on said first configuration;
   sealing the edges between said first and said second configuration about the periphery of said strips to form laterally spaced passages and end headers;
   inflating said configuration through inlet and outlet connectors on said second configuration to form a system of elongated passages connecting inlet and outlet headers.

* * * * *